United States Patent [19]
Goddard et al.

[11] Patent Number: 4,978,849
[45] Date of Patent: Dec. 18, 1990

[54] PEL PLACEMENT CORRECTION IN THE SCAN DIMENSION OF A MULTIPLE BEAM LASER SCANNING SYSTEM

[75] Inventors: Joan S. Goddard, Boulder; Wayne A. Overby; James A. Valent, both of Longmont, all of Colo.

[73] Assignee: International Business Machines Corporation, Armonk, N.Y.

[21] Appl. No.: 388,534

[22] Filed: Aug. 1, 1989

[51] Int. Cl.$^5$ .............................................. G01D 15/14
[52] U.S. Cl. .................................... 250/235; 346/108
[58] Field of Search ................ 250/235, 236; 346/108, 346/160; 350/6.7, 6.8; 358/296, 300, 302

[56] References Cited

U.S. PATENT DOCUMENTS

| | | | |
|---|---|---|---|
| 4,253,102 | 2/1981 | Kataoka et al. | 346/108 |
| 4,393,387 | 7/1983 | Kitamura | 346/108 |
| 4,404,571 | 9/1983 | Kitamura | 346/108 |
| 4,420,761 | 12/1983 | Kitamura | 346/108 |
| 4,423,426 | 12/1983 | Kitamura | 346/108 |
| 4,424,442 | 1/1984 | Kitamura | 250/236 |
| 4,443,695 | 4/1984 | Kitamura | 250/205 |
| 4,445,126 | 4/1984 | Tsukada | 346/108 |
| 4,467,334 | 8/1984 | Anzai et al. | 346/160 |
| 4,566,043 | 1/1986 | Tamura | 358/300 |
| 4,725,855 | 2/1988 | Arimoto et al. | 346/108 |
| 4,739,415 | 4/1988 | Toyono et al. | 358/296 |
| 4,806,951 | 2/1989 | Arimoto et al. | 346/108 |

*Primary Examiner*—Edward P. Westin
*Attorney, Agent, or Firm*—Charles E. Rohrer

[57] ABSTRACT

This is an electronic scheme for correcting mechanical misalignment and electrical delays from laser beam to laser beam in the scan direction of a multiple beam laser scanning system for use in an electrophotographic machine. The position at which a reference beam is turned on is sensed and adjusted to a desired position. Thereafter, the positions at which non-reference laser beams are turned on are sensed and adjusted to the desired position. In one enbodiment, the energization of laser beams is positioned at the trailing edge of the second element of a photodector. In a second embodiment, the point of full laser energy is matched, beam to beam, at the junction of the same two elements in a CCD array. Programmable delay lines are used to obtain sub-pel resolution.

13 Claims, 5 Drawing Sheets

PEL PLACEMENT CORRECTION IN THE SCAN DIMENSION OF A MULTIPLE BEAM LASER SCANNING SYSTEM

This invention relates to multiple beam laser scanning systems and more particularly to an electronic correction scheme for correcting pel placement errors due to mechanical misalignments and electrical propagation delays from laser beam to laser beam.

RELATED PATENT APPLICATIONS

U.S. Pat. No. 4,950,889 relates to a system for separating mechanical misalignment from chromatic aberrations and then correcting pel placement errors accordingly. This invention can be advantageously used with U.S. Pat. No. 4,950,889 in order to incorporate errors due to electrical propagation delays into the correction for mechanical misalignment.

BACKGROUND OF THE INVENTION

Multiple beam lasing systems can be used in a variety of applications, one of which is in a printing system where rotating polygonal mirrors are used to scan the light beams across a photoreceptive surface. The use of multiple laser beams in a printing system provides the capability of producing more than one line of information at a time, thus enabling high pel resolution, for example, 480 pels per inch or higher while keeping practical speeds for the rotating polygonal mirror. Multiple beam devices provide other capabilities as well; that is, the multiple beams can be used to alter the shape of the effective writing spot by modulating the spots within the spot group or they can be used to modulate the amount of light provided at each pel position.

While the use of multiple beam lasing systems have significant advantages over a single beam lasing system, multiple beam systems require precise mechanical alignment to assure that a print position (pel location) is properly located from line to line, that is, that a pel written by one laser is properly aligned with a pel written by another laser. Multiple beam systems which employ laser arrays require that the lasing diodes be placed on the chip at close tolerance in order to get correct pel placement; nevertheless, there can be some physical misplacement of the semiconductor laser diodes within the chip making it desirable to provide a system which can utilize laser arrays with some laser spot variation. Additionally, laser array chips are typically tilted to provide correct beam alignment in the non-scan direction. However, the tilt creates an offset from beam to beam in the scan direction, thus creating pel placement problems. As used herein, the term mechanical misalignment includes: (1) physical variation in the placement of lasing spots on a laser array chip, (2) mechanical misalignment of a laser array chip, or of discrete lasing sources within a machine; and (3) the offset produced by tilting a laser array.

Still another problem with multiple beam lasing systems is variable electrical propagation delays resulting from the use of different laser drivers for each laser source. Even though the drivers are of the same design, the different components comprising the drivers create a variable delay in turning the beams on and off from one laser to another, thus creating pel placement variations. Since these variations can change with the temperature and age of the laser driver, pel placement errors change dynamically.

Electronic correction schemes in the prior art achieve multiple pel correction for misalignments due to a necessary tilting of a laser array. Some of these electronic schemes provide sub-pel accuracy. Such systems require nanosecond resolution when high resolution systems are contemplated, that is, 480 pels per inch or higher. Clock frequencies of $500 \times 10^6$ Hz are required to resolve to two nanoseconds. Such a clock and the high speed logic utilizing such resolution are expensive.

It is an object of this invention to provide an electronic correction scheme for use with a multiple beam scanning lasing system to provide correction for electrical propagation delays as well as for mechanical misalignment errors.

It is also an object of this invention to provide a closed loop electronic correction scheme for such errors.

It is still another object of this invention to provide an electronic correction scheme utilizing relatively low clock frequencies, but providing correction resolution within nanoseconds.

It is another object of this invention to provide a correction scheme which is relatively insensitive to variations in the intensity of different laser beams and in variations in the size of laser spots from beam to beam.

It is still another object of this invention to provide an electronic correction scheme which is dynamically adaptive to temperature and/or age as they create dynamic variations in mechanical misalignment or electrical propagation delay.

SUMMARY OF THE INVENTION

This invention relates to electronic correction for electrical propagation delays as well as mechanical misalignment problems within a multiple beam laser printhead by providing a closed loop correction system in which control signals are produced from the energization of the laser beams. Energization points are then moved to a desired location and matched, beam to beam. Sub-pel correction is achieved with relatively low clock frequencies through the use of tapped or programmable delay lines.

The method of correcting pel placement involves sensing the position at which a reference laser beam turns on and then adjusting that position to a desired point. Non-reference laser beams are then turned on, one at a time, and the turn-on point adjusted until it is at the same position as the reference beam. This enables the beams to write pels in alignment from line to line despite the presence of mechanical and electrical skew.

In one embodiment, beams are aligned by sensing the turn-on point at the trailing edge of a sensing element. In a second embodiment, beams are aligned by matching the points of full laser energy, beam to beam, at the junction of the same two elements of a CCD array.

In both embodiments, tapped delay lines or programmable delay lines are used to provide resolution to a sub-pel basis.

BRIEF DESCRIPTION OF THE DRAWING

The above-mentioned objects and other features and objects of this invention, and the manner of attaining them will become more apparent and the invention itself will best be understood by reference to the following description of embodiments of the invention taken in conjunction with the accompanying drawing, the description of which follows.

DETAILED DESCRIPTION OF THE PREFERRED EMBODIMENTS

The application of this invention can be illustrated within the framework of electrophotographic machines wherein prints are produced by creating an image of the subject on a photoreceptive surface, developing the image, and then fusing the image to paper or other print receiving material. In most electrophotographic machines the electrophotographic process is of the transfer type where photoreceptive material is placed around a rotating drum or arranged as a belt to be driven by a system of rollers. In the typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays from a light generating source which will discharge the photoreceptor to relatively low levels when the light source is fully powered, while the photoreceptor will continue to carry high voltage levels when the light source is turned off, or when it is powered at intermediate levels or for a relatively short duration. In that manner, the photoreceptive material is caused to bear a charge pattern which corresponds to the printing, shading, etc., which is desired to be printed on the receiving material.

Light generating sources in an electrophotographic printer are frequently comprised of lasing means in which the beam is modulated by a character generator to control the power or the length of time that a beam exposes the photoconductor in a particular pel area. In a multiple beam lasing system, character generators may modulate more than one beam at a time, so that more than one line of pels may be written at a time.

After producing an image on the photoreceptor, the image is moved to a developing station in the machine where developing material called toner is placed on the image. This material is usually in the form of a powder which carries a charge designed to cause the powder to deposit on selected areas of the photoreceptor.

The developed image is moved from the developer to a transfer station where the copy receiving material, usually paper, is juxtaposed to the developed image and a charge is placed on the backside of the paper so that when it is stripped from the photoreceptor the toner material is held on the paper and removed from the photoreceptor.

The remaining process steps are for permanently bonding toner material to the copy paper and cleaning residual toner left on the photoreceptor so that it can be reused.

Figure 1:
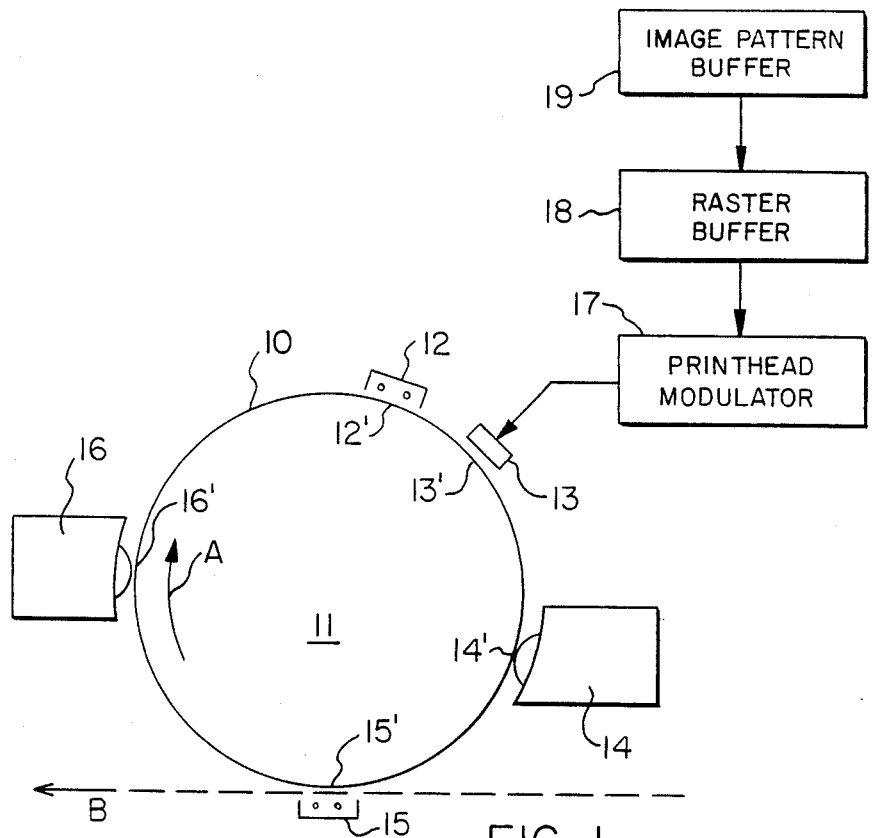
FIG. 1 is a diagrammatic representation of an electrophotographic machine.

FIG. 1 shows a typical electrophotographic machine such as would be used to implement this invention. Photoreceptive material 10 is placed on the surface of a drum 11 which is driven by motive means, not shown, to rotate in the direction A. A charge generator 12 places a uniform charge of several hundred volts across the surface of the photoreceptor at charging station 12'. The charged photoreceptor is mounted in a dark enclosure, not shown, and rotates to a printhead 13 which is comprised of a light generating source, such as a multiple beam laser generator. The light source selectively exposes the charged photoreceptor at imaging station 13' to discharge it in areas which are desired to be developed (Discharged Area Development, DAD process), or discharge it in areas which are to remain free of toner (Charged Area Development, CAD process).

For a DAD process, the discharged areas of the photoreceptor are developed at developing station 14' by developer apparatus 14 which applies toner so that the photoreceptor carries a visually perceptible image of the data. The developed image rotates to transfer station 15' where print paper, moving in the direction B, is juxtaposed with the surface of the photoreceptor. A charge opposite in polarity to the charge on the toner is placed on the backside of the print paper by transfer charge generator 15 such that when the paper is stripped from the surface of the photoreceptor, toner will be attracted to the paper and leave the surface of photoreceptor 10. Any remaining residual toner is cleaned from the photoreceptor at cleaning station 16' by cleaning apparatus 16.

The selective application of light rays to the photoreceptor 10, at imaging station 13', is accomplished through printhead modulator means 17. For a semiconductor laser diode, the printhead modulator is comprised of a power supply, which will either turn the light source on for longer or shorter periods of time to accomplish varying degrees of photoreceptor discharge in accordance with the pattern data, or it will turn the light-generating source on to a greater or lesser illumination intensity in accordance with that data. In any event, modulation will occur in accordance with that data contained in memory 19. That data is sent to a raster buffer 18 and on to the printhead modulator 17.

Figure 2:
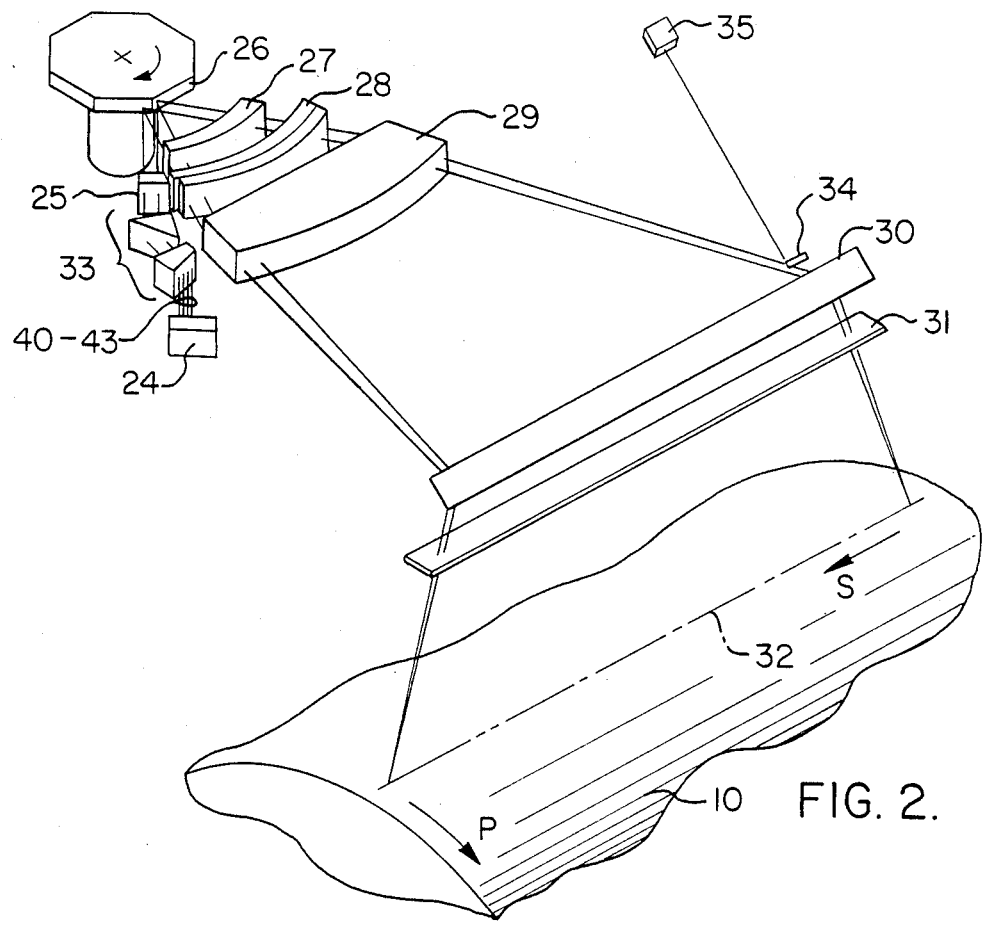
FIG. 2 shows a laser array optical system for use in the machine of FIG. 1.

FIG. 2 shows an optical scanning system for use in printhead 13 of the electrophotographic machine shown in FIG. 1. In the multiple beam system illustrated in FIG. 2, four (4) nearly coaxial laser beams 40-43 are shown emanating from a multiple beam laser array module 24. The four (4) laser beams 40-43 are passed through a cylindrical lens 25 for focusing each of the beams onto the facets 26 of a rotating polygonal mirror. The beams are reflected from the rotating mirror through a negative power spherical lens group 27, anamorphic lens group 28, and a positive power spherical lens group 29, and onto the surface of photoreceptor 10. FIG. 2 shows a fold mirror 30, an exit window 31, the length 32 of the scan across photoreceptor 10, and beam expanding optics 33. A reflective surface 34 is provided to reflect light from each laser beam to photodetector 35 in order to derive start of scan (SOS) signals. A similar arrangement can be used for generating end of scan (EOS) signals or a reflective surface can direct the end of scan light beam back to detector 35 so that the same detector can be used for both SOS and EOS signals.

Figure 3:
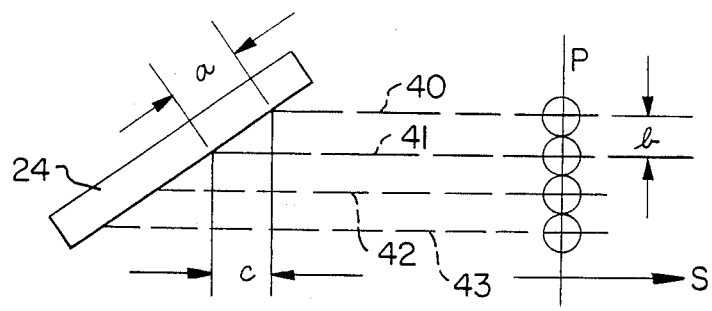
FIG. 3 shows a laser array tilted to produce proper pel alignment in the process direction, but thereby creating improper pel alignment in the scan direction unless corrected. Corrected pel alignment is shown.

FIG. 3 is an illustration of the need to tilt laser array module 24 in order to provide proper pel placement in the process direction P. At a resolution of 480 pels per inch, pels must be placed at 480th of an inch intervals (b dimension in FIG. 3). The lasing spots on the array 24 would require a similar close spacing in order to locate the laser array 24 parallel to the axis P of the process direction. However, it is not practical to manufacture laser arrays to such tight tolerances Therefore, array 24 is tilted at an angle such that the lasing spots can be separated by distance "a" greater than distance b and still produce pels which are properly spaced distance b between scan lines. In so doing, the lasing spots are offset distance c in the scan direction S. Therefore, it is necessary in laser array systems to electronically offset the start of printing in the scan direction between laser beams by the time needed to traverse distance c in order to mate pel locations properly in the scan direction.

If laser beam 40 is chosen as the reference laser, pels printed by laser beam 41 must be delayed a sufficient time for the laser beam 41 to traverse the distance c. Similarly, pels printed by beam 42 must be delayed approximately twice the amount the of beam 41, and pels printed by beam 43 must be delayed about three times the amount of delay for beam 41. Systems have been devised to provide for this type of correction, however, prior art systems have not taken into account electrical propagation delays between beams.

Figure 4:
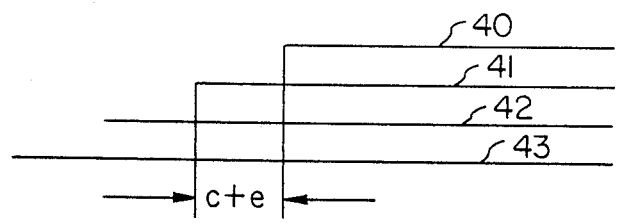
FIG. 4 illustrates the effect of electrical propagation delays together with mechanical misalignment.

FIG. 4 illustrates the effect of electrical propagation delays and shows that in addition to mechanical misalignment factors, the electrical propagation delay must be added in order for the pels to properly line up. That is, the correct delay for pels in scan line 41 relative to the reference scan line 40 must take into account the electrical error e as well as the mechanical error c.

Figure 5:
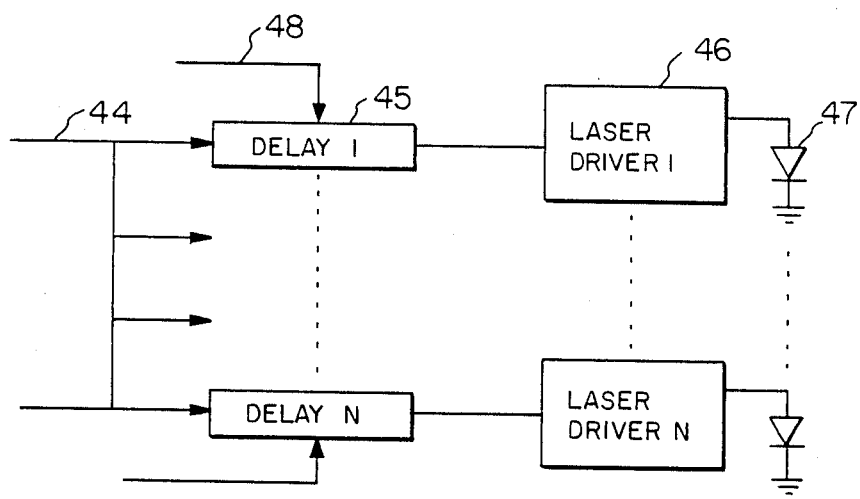
FIG. 5 is a block diagram of a simple implementation for reducing pel placement errors to acceptable limits in the scan dimension.

FIG. 5 is a simple block diagram of a circuit to perform the needed correction. A gated pel clock signal 44 is applied to delay line 45 which then activates the laser driver 46 at the proper time to energize laser 47. The correct delay for laser driver 46 is provided through the delay select line 48. Similarly, other delays for other laser drivers in the multiple beam system are provided with the proper delay to have each pel line up properly along the various scan lines.

Figure 6:
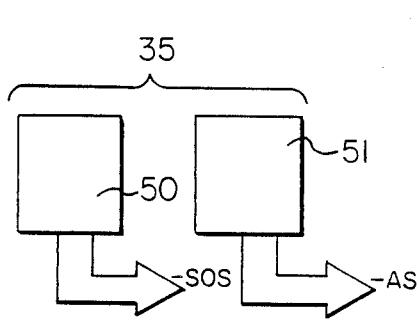
FIG. 6 is an illustration of a dual detector approach for use in one embodiment of the invention.

FIG. 6 shows an embodiment of the photodetector 35 for providing the information needed to correct for electrical propagation delay as well as for mechanical misalignment. One of the elements required for a scan timing correction system is a device that can measure the timing skew, both mechanical and electrical, between the beams. The device shown in FIG. 6 is a two element start of scan (SOS) sensor 35 whose location is shown in FIG. 2. The sensor does not need to be near the photoreceptive surface 10, but it should be located at a similar distance from the polygonal mirror where the beams are in focus. The two element sensor 35 shown in FIG. 6 is mounted perpendicular to the scan direction of the beams.

In the typical timing arrangement shown in the prior art, a reference laser beam moves across a two element detector, such as the detector 35, and produces a start of scan pulse from the first element 50, and a second pulse from the element 51. In a second scan, the reference laser is energized until element 50 has been traversed and then it is de-energized. A short time later, laser 1 is energized and illuminates the aligning element 51. This enables the determination of the amount of delay needed to match laser 1 to the second pulse of the reference laser. However, this prior art scheme measures only the mechanical misalignment between the reference and the non-reference laser, and does not measure the electrical propagation delay since the pulses are generated from laser beams that are energized. In order to measure propagation delays, a scheme must be devised that operates from the turn on time of the reference laser, together with the turn on time of the non-reference laser. In that manner, the mechanical misalignment and electrical propagation delay can be measured together The two element sensor shown in FIG. 6 is utilized in the current invention to sense the relative displacement of the different laser beams as they pass by. Delay lines are used to provide a sub-pel compensation for the start of scan position, as will be more fully explained with reference to FIG. 7. In the inventive system, synchronization is achieved from the start of scan sensor element 50, that is, when a reference laser beam energizes the start of scan, sensor element 50, a gated clock is resynchronized. The reference laser, for example, laser beam 40 in FIG. 3, is turned on prior to the time that it reaches the sensor element 50. As the reference laser beam activates the start of scan sensor element 50, a synchronous pulse is generated which is used to gate the gated clock. The reference laser beam 40 is turned off after generating the sync signal, and then turned back on, just as it leaves the trailing edge of the align sensor element 51. To do that, a clock value is loaded into a down counter 64, FIG. 8, which approximates the number of clock pulses between the sensor element 50 and the trailing edge of align sensor element 51. When the counter reaches zero, the reference laser 40 is turned back on, and in the case where the align sensor is energized, a new value increased by one greater than the previous value will be loaded into the down counter and the process run again. If the align sensor 51 is again energized, the value in the down counter will again be increased by one and the process run again. The process will be repeated, until the align sensor element is not energized by the reference laser beam. At that point, the down counter will be backed off by one and the number of clock pulses delay in the down counter will approximate the length of time it takes for the reference laser 40 to move from the start of scan position to the trailing edge of the align sensor. At this point, the course adjustment is complete and the fine adjustment takes over. That is, a programmable delay line 63, FIG. 8, is adjusted in a similar fashion to provide that portion of the final clock pulse over which the align sensor senses the presence of the beam.

Figure 7:
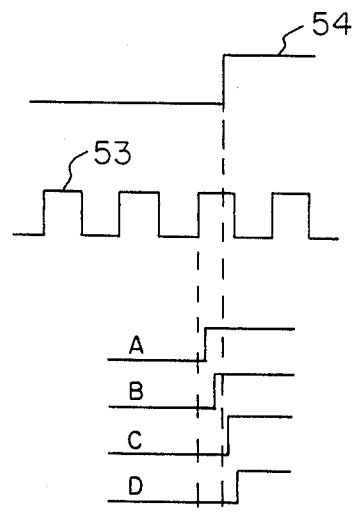
FIG. 7 illustrates the effect of a programmable delay line in achieving a high resolution system with a relatively low frequency clock.

FIG. 7 illustrates the application of a succession of pulses produced by a tapped or programmable delay line 63, which can provide fine resolution within the time period of the gated clock pulse 53. After the course adjustment is complete, the programmable delay line 63 is set to a minimum. If the align sensor is activated, the delay is incremented by one and the process continued until the align sensor is not activated. In FIG. 7, the alignment pulse 54 is sensed to occur between the tap B and tap C. Since tapped delay lines with a resolution of 1 or 2 nanoseconds are currently available, the rise of pulse 54 can be detected to a resolution of 1 or 2 nanoseconds which is likely to be 1/10th pel or better, even if the resolution is at 480 pels per inch or higher. In this manner, the delay period from the time at which the reference laser beam 40 generates the sync signal to the time at which the laser beam 40 leaves the align sensor is identified. That delay period is used to control writing with laser beam 40 and is loaded into the proper delay element, for example, element 45 in FIG. 5.

In adjusting the other laser beams to the reference beam, the process is repeated as follows. The reference beam is turned on so that it can energize the SOS sensor element 50 and thereby produce a sync pulse. It is then turned off, and the next laser beam, laser beam 41, is turned on at about the time it leaves the align sensor element 51. That is accomplished by setting an approximate count in the down counter 75. Should the align sensor 51 sense laser beam 41, the down counter count is incremented by one until that point is reached when the align sensor is no longer energized. At that point, the down counter is backed off by one and the programmable delay line 75 is adjusted to find that portion of the final clock cycle at which the align sensor is no longer energized. In that manner, the delay period needed from the time at which the reference laser beam 40 generates the sync signal, to the time at which the laser beam 41 leaves the align sensor is identified. That delay period is used to control writing with laser 41 and is loaded into the proper delay element in FIG. 5. Similarly, any other lasers in the multiple beam system are also tested relative to the reference laser, in order to find that delay value which is appropriate for each beam. Since the rise of each laser beam is utilized in this procedure, the delay factor for each laser beam provides for electrical skew as well as mechanical skew in the scan direction.

Figure 8:
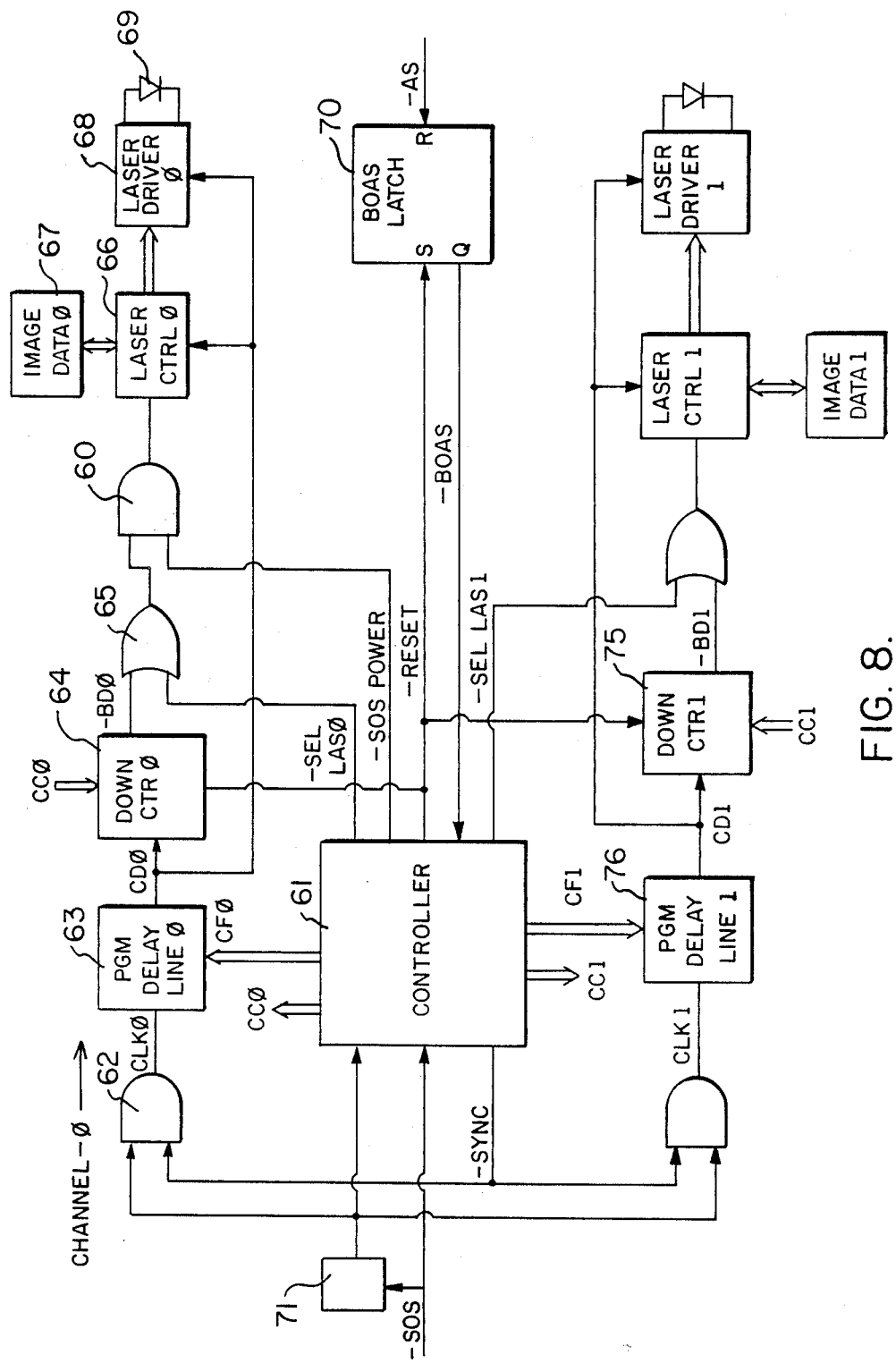
FIGS. 8 is a block diagram of a circuit for use with the sensors of FIG. 6.

FIG. 8 is a detailed block diagram of the system that measures mechanical and electrical skew to high resolution without using extremely high speed logic. FIG. 8 shows the elements for a two laser system, with channel 0, being nearly identical to channel 1. The only difference is that channel 0 contains an additional AND gate 60. Since the operation of both channels is nearly the same, only the operation of channel 0 will be discussed in detail.

There are two key elements to the operation of the system shown in FIG. 8. First, the high resolution programmable delay line 63 permits accurate indirect time measurement. Since the process is a nulling type scheme referencing the relative position of different beams, the absolute accuracy of the programmable delay line is not important. Second, electrical skew is included in the measurement by energizing the laser at a time at which its beam is nearly finished traversing the aligned sensor.

FIG. 8 shows a controller 61 receiving the start of scan signal from element 50. Controller 61 loads a count into the down counter 64 for beginning the alignment process. Programmable delay line 63 provides the subpel correction and the total delay is passed through OR gate 65 and AND gate 60 to the laser control circuit 66. Control circuit 66 also receives image data 67 in order to modulate the laser driver 68, which energizes the laser chip 69. The alignment signal from the sensing element 51 is received by the beam-on-alignment-sensor (BOAS latch) 70. Since the alignment sensor signal can be a very brief duration, the latch 70 is utilized.

Figure 9A:
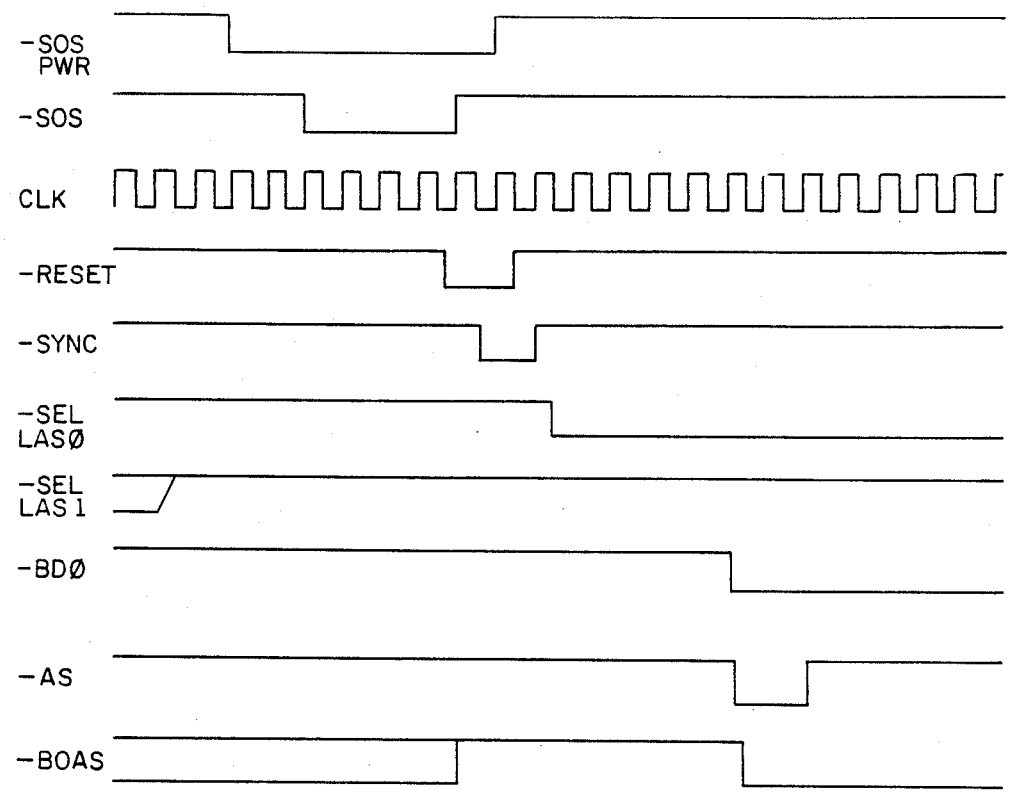
FIGS. 9A and 9B are timing diagrams for the signals present in the circuit of FIG. 8.
Figure 9B:
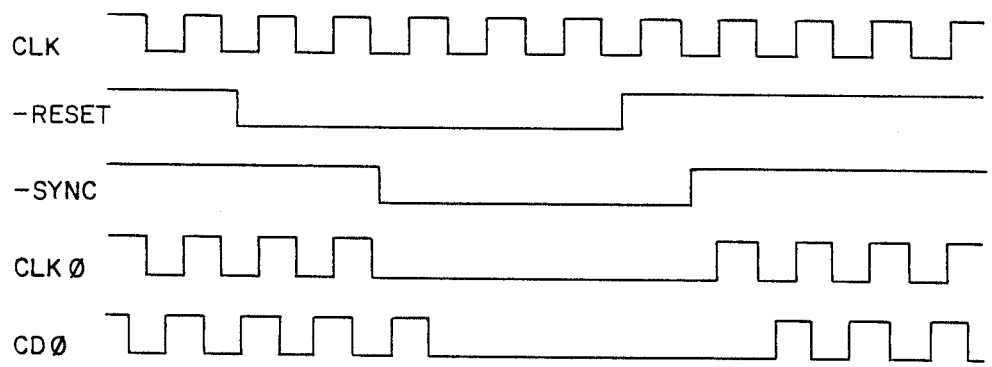

FIG. 9A shows various timing events in the circuit of FIG. 8. FIG. 9B is an expansion of the timing around the sync position. During the adjustment phase, the data contained in image data 67, is all "one's" and will cause laser 0 to emit light when data is clocked into laser driver 68. Controller 61 is the timing center and decision making element for the system. It generates a signal "SOS PWR" for every scan. That signal is input to AND gate 60. The result is that the reference laser is turned on at a time in which it can energize the first element of the SOS sensor 50 and thereby generate the SOS signal. The SOS signal is the synchronization signal for the entire system. The SOS PWR signal remains active until controller 61 detects the rise of SOS. On each scan, the gated clock signal which is produced by precision oscillator 71, is resynchronized upon detection of SOS. Controller 61 then generates the reset and sync signals via a logical combination of the trailing edge of SOS and gated clock signals.

Controller 61 determines the amount of delay set in the programmable delay line 63, via the multiple lines labeled CFO. The program delay line 63 is the fine delay mechanism typically having a 1 or 2 nanosecond step size. Controller 61 also determines the amount of full pel delay required by supplying the proper counter load value CCO for the down counter 64. Down counter 64 provides the course delay for the system. When controller 61 issues the reset command, CCO is loaded into down counters 64, along with the setting of the latch 70. At this time, the output latch 70 goes to a high level as shown in FIG. 9A.

Timing of signals is most crucial around the sync time, and therefore an expanded view is shown in FIG. 9B. The sync signal is the start of timing events for the scan timing correction system and is generated by controller 61 a specific number of clock cycles after the activation of the SOS signal. The sync signal is one input to the AND gate 62, and must make its transitions when the clock signal is low. The sync signal remains low for several clock cycles to guarantee that the programmable delay line 63 clears out and remains low. Controller 61 must guarantee that the rising edge of the sync pulse is repeatable with respect to the falling edge of the start of scan signal on every scan. By gating the input to the delay line, it is possible to use the delay line to generate a delay on a clock signal that is greater than one cycle of the clock.

Figure 10:
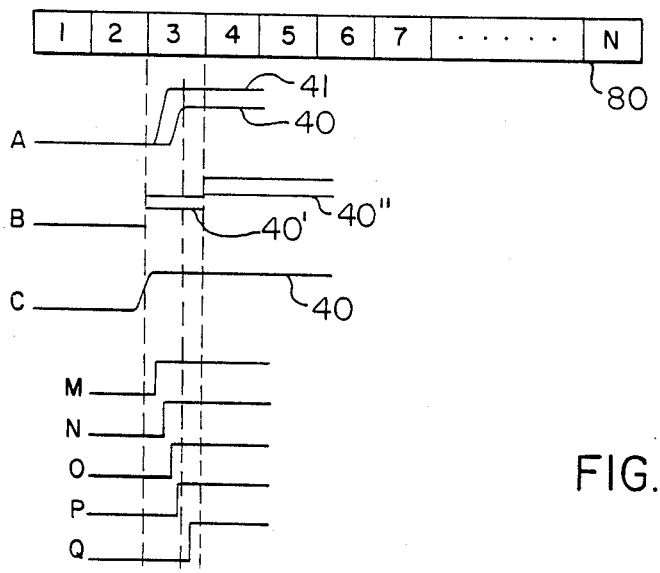
FIG. 10 illustrates a second embodiment of the invention.

FIG. 10 is an illustration of a second embodiment of the invention. A charge coupled device (CCD) array 80 is used in place of the dual element start of scan sensor 35. Array 80 is located in the optical system shown in FIG. 2 at approximately the same location as the sensor element 35. CCD array 80 is designed to sense the position of the laser beams relative to each other. Essentially, CCD arrays are a series of semiconductor elements similar to a photodiode, such that when light strikes the element a capacitor associated with the element is charged. The amount of charge is determined by the energy supplied, that is, the intensity of the light during the period of time over which the light strikes the semiconductor. CCD arrays can be either one dimensional or two dimensional, and in this case, a one dimensional CCD array 80 is used, as shown in FIG. 10. The array has electronics associated with it, such that the amount of energy supplied to any particular semiconductor can be ascertained. In the array shown in FIG. 10, an N element array is utilized.

In the scheme of this embodiment, the reference laser beam 40 is turned on at some point during the traversing of the CCD array. For example, the reference beam 40 is sensed during the traversing of CCD element 3, as shown in FIG. 10, at trace A. Trace B illustrates that the energy associated with element 3 has risen a substantial amount, as shown at 40', over the zero energy level at CCD element 2. During element 4 and thereafter, the energy associated with the elements of the CCD array are all at a maximum level 40''. Thus, the CCD array 80 has ascertained that the reference laser beam 40 turned on during the traversing of element 3. Next, a programmable delay line such as previously described, is used in order to reposition the laser beam 40 turn on point, such that full energy at element 3 is accurately positioned. That is to say, it is desirable to move the turn on point of the reference laser beam 40 to the position shown in trace C, so that it reaches full energy right at the beginning of the traversing of CCD element 3. A programmable delay line provides a succession of pulses as shown at M-Q during the period in which the beam traverses element 3, and thereby the transition (turn-on point of laser beam 40) is sensed as occurring between taps P and Q of the programmable delay line. By adjusting the delay a proper amount through the circuit of FIG. 5, the turn on point for laser beam 40 is shifted so that full laser energy is located at the junction of elements 2 and 3, as shown on trace C of FIG. 10.

When adjusting the other beams to match the reference beam, they are turned on one at a time when the beam is within the ambit of the CCD array, and then the delay is adjusted until it also begins to peak at element 3. For example, trace A in FIG. 10 shows the rise of the laser 41, and incidentally, shows that laser 41 produces a higher energy level than does the reference laser 40. The programmable delay line is then utilized to ascertain the exact position of the turn on of laser 41 on CCD array element 3, and then an adjustment is made to move the turn on point of laser 41 to match the turn on point of laser 40, that is, maximum energy of laser 41 will occur at the junction of elements 2 and 3 of the array 80. In that manner, the two beams are aligned.

One advantage of the CCD array embodiment is that if a particular lasing beam is brighter or larger in spot size than another laser, the full energy point is still exactly the same regardless of which laser beam is striking the CCD array. The absolute value of the energy is not measured, but rather the position at which the laser spot reaches full energy. Since the measurements are made for the turn on of the laser beams, electrical propagation delay as well as mechanical misalignment is factored into the positioning process.

While the invention has been shown and described with reference to preferred embodiments thereof, it will be understood that changes in the form and details of the invention may be made therein without departing from the spirit and scope of the invention. For example, the invention was explained for the situation where the align sensor was energized by the laser beam and the down counter was then incremented until the beam was no longer sensed. Should the initial scan fail to energize the align sensor, the down counter would be decremented until the beam is sensed.

What is claimed is:

1. A method of correcting picture element (pel) placement in the scan direction of a multiple beam laser scanning system comprising the steps of:

sensing the position in the scan at which a reference laser beam turns on;
adjusting the position of said reference laser beam to turn on at a desired point in said scan;
sensing the position in said scan at which a non-reference laser beam turns on;
adjusting the position of said non-reference laser beam to turn on at the same position in said scan as said reference laser beam; and
writing pels produced by both reference and non-reference beams in accordance with the adjusted positions to thereby correct for the effects of mechanical and electrical skew.

2. The method of claim 1 wherein the step of sensing the position at which said reference laser beam turns on, includes the steps of:

scanning said reference beam in an energized state across a first photodetector element to generate a reference pulse;
turning said reference beam off;
scanning said reference beam across a second photodetector element and turning said reference beam on in time to generate a first pulse from said second element.

3. The method of claim 2 wherein the step of adjusting the position of said reference beam includes the steps of:

repositioning the leading edge of said first pulse so that said first pulse energizes said second photodetector element at the trailing edge thereof to thereby establish a reference beam time period between said reference pulse and said first pulse.

4. The method of claim 3 wherein the steps of sensing the position of a non-reference beam includes the steps of:

producing said reference pulse by said reference beam;
turning said reference beam off;
scanning said non-reference beam across said second photodetector element and turning said non-reference beam on in time to generate a non-reference pulse from said second element.

5. The method of claim 4 wherein the step of adjusting the position of said non-reference beam includes the steps of:

repositioning the leading edge of said non-reference pulse so that said first pulse energizes said second photodetector element at the trailing edge thereof to thereby establish a non-reference beam time period between said reference pulse and said non-reference pulse.

6. The method of claim 5 wherein the step of repositioning the leading edge of said first pulse includes the steps of:

producing a chain of clock pulses gated to said reference pulse;
producing said first pulse on a first scan of said reference beam;
determining the number of whole clock pulses between said reference pulse and said first pulse;
incrementing the number of whole clock pulses between the reference pulse and the first pulse by one on each successive scan of said reference beam until said first pulse is no longer produced, then backing off said number of whole clock pulses by one to produce a determined number of whole clock pulses;

producing a succession of incremental pulses of equal duration during the clock pulse following the last of the whole clock pulses determined in the step immediately above;

determining the number of incremental pulses prior to extinguishment of said first pulse;

adding the whole number of clock pulses to the number of incremental pulses to obtain a measure of said reference time period.

7. The method of claim 6 wherein the step of repositioning the leading edge of said non-reference pulse includes the steps of:

producing said non-reference pulse on a first scan of said non-reference beam;

determining the number of whole clock pulses between said reference pulse and said non-reference pulse;

incrementing the number of whole clock pulses between said reference pulse and said non-reference pulse by one on each successive scan of said non-reference beam until said non-reference pulse is no longer produced, then backing off said number of whole clock pulses by one to produce a determined number of clock pulses;

producing a succession of incremental pulses of equal duration during the clock pulse following the last whole clock pulse determined in the step immediately above;

determining the number of incremental pulses prior to extinguishment of said non-reference pulse;

adding the determined number of whole clock pulses to the number of incremental pulses to obtain a measure of said non-reference beam time period.

8. The method of claim 1 wherein the step of sensing the position at which said reference laser beam turns on includes the steps of:

scanning said reference beam in a de-energized state across a CCD array;

turning said reference beam on in time to produce signals from said CCD array.

9. The method of claim 8 wherein the step of adjusting the position of said reference beam is accomplished by moving the turn on point of the reference beam until full laser energy is sensed at a junction of directly adjacent CCD array elements.

10. The method of claim 9 wherein the step of sensing the position of said non-reference beam includes the steps of:

scanning said non-reference beam in a de-energized state across said CCD array;

turning on said non-reference beam in time to produce signals from said CCD array.

11. The method of claim 10 wherein said step of adjusting the position of said non-reference beam is accomplished by moving the turn-on point of said non-reference beam until full laser energy is sensed at a junction of directly adjacent CCD array elements.

12. The method of claim 11 wherein the step of adjusting the position of the reference beam further includes the steps of:

producing a succession of incremental pulses during the period in which the reference laser beam traverses the CCD element immediately prior to that adjacent CCD element first sensing full reference beam laser energy;

determining the number of incremental pulses prior to sensing full laser energy;

moving said turn on point of said reference laser beam in accordance with the determined number of incremental pulses.

13. The method of claim 12 wherein the step of adjusting the position of the non-reference beam further includes the steps of:

moving the turn on point of said non-reference beam so that full laser energy is first sensed in the CCD array element immediately following that CCD element identified as first sensing full laser energy in claim 12;

producing a succession of incremental laser beams during the period in which the non-reference laser beam traverses the CCD element immediately prior to that adjacent CCD element first sensing non-reference laser beam full energy;

determining the number of incremental pulses prior to sensing full laser energy;

moving said turn on point of said non-reference laser beam in accordance with the determined number of incremental pulses.

* * * * *